United States Patent
Tekawy et al.

(10) Patent No.: US 8,099,186 B2
(45) Date of Patent: Jan. 17, 2012

(54) SATELLITE NAVIGATION USING LONG-TERM NAVIGATION INFORMATION AND AUTONOMOUS ORBIT CONTROL

(75) Inventors: Jonathan A. Tekawy, Newport Beach, CA (US); Raymond S. DiEsposti, Lakewood, CA (US); Clifford W. Kelley, Rancho Palos Verdes, CA (US); Jya-Syin W. Chien, Tustin, CA (US)

(73) Assignee: The Boeing Company, Chicago, IL (US)

( * ) Notice: Subject to any disclaimer, the term of this patent is extended or adjusted under 35 U.S.C. 154(b) by 1178 days.

(21) Appl. No.: 11/742,776

(22) Filed: May 1, 2007

(65) Prior Publication Data

US 2008/0177430 A1 Jul. 24, 2008

Related U.S. Application Data

(63) Continuation-in-part of application No. 11/615,259, filed on Dec. 22, 2006.

(51) Int. Cl.
 *G01C 21/00* (2006.01)
(52) U.S. Cl. ....... 700/226; 700/13; 700/200; 244/158.1; 244/158.4; 244/158.6; 244/158.8; 244/164; 244/171; 244/171.1; 342/357.66
(58) Field of Classification Search .................. None
See application file for complete search history.

(56) References Cited

U.S. PATENT DOCUMENTS

| | | | | |
|---|---|---|---|---|
| 4,911,385 A | * | 3/1990 | Agrawal et al. | 244/165 |
| 5,184,790 A | * | 2/1993 | Fowell | 244/165 |
| 5,267,167 A | * | 11/1993 | Glickman | 701/226 |
| 5,860,056 A | * | 1/1999 | Pond | 455/13.3 |
| 5,910,788 A | | 6/1999 | Class | |
| 5,943,606 A | | 8/1999 | Kremm et al. | |
| 6,018,390 A | * | 1/2000 | Youmans et al. | 356/477 |
| 6,133,870 A | * | 10/2000 | Wehner | 342/357.36 |
| 6,157,896 A | * | 12/2000 | Castles et al. | 702/95 |
| 6,201,953 B1 | * | 3/2001 | Dwyer | 455/226.1 |
| 6,241,192 B1 | * | 6/2001 | Kondo et al. | 244/158.4 |
| 6,243,026 B1 | | 6/2001 | Jones et al. | |
| 6,296,205 B1 | | 10/2001 | Hanson et al. | |
| 6,542,820 B2 | | 4/2003 | LaMance et al. | |
| 6,731,240 B2 | | 5/2004 | Dybdal et al. | |

(Continued)

OTHER PUBLICATIONS

DiEsposti, Raymond, et al., "The Proposed State Vector Representation of Broadcast Navigation Message for User Equipment Implementation of GPS Satellite Ephemeris Propagation," proceedings of the Institute of Navigation (ION) National Tech Meeting (NTM), Jan. 2004, pp. 294-312.

(Continued)

*Primary Examiner* — Khoi Tran
*Assistant Examiner* — Jonathan L Sample
(74) *Attorney, Agent, or Firm* — Haynes and Boone, LLP

(57) ABSTRACT

An improved approach to satellite-based navigation (e.g., GPS) is provided. In one embodiment, a method includes determining a nominal orbital path of a navigation satellite. The method also includes transmitting ephemeris data corresponding to the nominal orbital path from the navigation satellite to a plurality of navigation devices. The method further includes determining an actual orbital path of the navigation satellite locally at the navigation satellite. In addition, the method includes determining a deviation between the actual orbital path and the nominal orbital path locally at the navigation satellite. The method also includes autonomously adjusting the actual orbital path locally at the navigation satellite to reduce the deviation between the actual orbital path and the nominal orbital path.

12 Claims, 9 Drawing Sheets

U.S. PATENT DOCUMENTS

| | | |
|---|---|---|
| 6,771,625 B1 | 8/2004 | Beal |
| 6,845,950 B1 * | 1/2005 | Goodzeit et al. ............ 244/158.6 |
| 7,065,440 B2 * | 6/2006 | Aral ................................ 701/50 |
| 2002/0038840 A1 * | 4/2002 | Maeda et al. .............. 244/158 R |
| 2003/0098810 A1 * | 5/2003 | Lee et al. .................. 342/357.06 |
| 2003/0132878 A1 * | 7/2003 | Devereux et al. ......... 342/357.06 |
| 2003/0169201 A1 | 9/2003 | Dybdal et al. |
| 2005/0104772 A1 * | 5/2005 | Diggelen et al. .......... 342/357.02 |
| 2006/0114150 A1 * | 6/2006 | van Diggelen et al. ... 342/357.02 |
| 2007/0200752 A1 * | 8/2007 | van Diggelen et al. ... 342/357.01 |
| 2007/0241957 A1 * | 10/2007 | Murphy ................... 342/357.02 |
| 2007/0257838 A1 | 11/2007 | Cheng |
| 2007/0260399 A1 * | 11/2007 | Abraham et al. .............. 701/226 |
| 2008/0004758 A1 * | 1/2008 | Lane ............................... 701/13 |
| 2008/0111738 A1 * | 5/2008 | Han ......................... 342/357.12 |
| 2008/0129593 A1 * | 6/2008 | Garin et al. .............. 342/357.15 |
| 2009/0321579 A1 | 12/2009 | Dorman |

OTHER PUBLICATIONS

Bate, Roger R., et al., "Fundamentals of Astrodynamics," Dover Publications, 1971, pp. 2-15 and 58-61.

Parkinson, B.W., et al., eds., "Global Positioning System: Theory and Applications vol. I," American Institute of Aeronautics and Astronautics, Inc., 1996, pp. 135-141.

Wertz, J.R., et al., eds., "Space Mission Analysis and Design, Third Edition," Microcosm Press and Kluwer Academic Publishers, 1999, pp. 144-147.

Lange, Benjamin, "The Drag-Free Satellite," AIAA Journal, vol. 2, No. 9, Sep. 1964, pp. 1590-1606.

Lange, Benjamin, "Experimental Gravitational Physics Using Drag-Free Satellites," www.dragfreesatellite.com/home.html, 2001, pp. 1-2.

* cited by examiner

SATELLITE NAVIGATION USING LONG-TERM NAVIGATION INFORMATION AND AUTONOMOUS ORBIT CONTROL

CROSS-REFERENCE TO RELATED APPLICATIONS

This application is a continuation-in-part of and claims the benefit of U.S. patent application Ser. No. 11/615,259 filed on Dec. 22, 2006 which is incorporated herein by reference.

TECHNICAL FIELD

The present invention relates generally to satellite-based navigation.

BACKGROUND

As is well known, conventional navigation devices compatible with the Global Positioning System (GPS) and Global Navigation Satellite System (GNSS) can aid users of such devices in determining their positions relative to various navigation satellites configured in a constellation. In this regard, satellite trajectory information is generally broadcast to such conventional navigation devices (e.g., GPS receivers), by satellites as ephemeris data from which satellite positions can be predicted. These devices then use the satellite ephemeris position information along with ranging measurements to solve for their own positions using a triangulation process or similar process.

However, due to gravity perturbation effects (e.g., caused by the Earth gravity harmonics, sun, moon, and other bodies) and other external perturbations (e.g., solar pressure disturbances), such ephemeris data is generally accurate for only short periods of time. Indeed, predicted satellite positions determined using such ephemeris data may deviate from the true (i.e., actual) satellite positions by as much as a few hundred meters for just a few hours outside of the time interval of validity. Errors of this magnitude are too large for most GNSS based navigation applications, and the trend over the past two decades has been to reduce the Signal-in-Space (SIS) ranging error due to ephemeris and satellite clock from several meters to the current level of one or two meters for GPS satellites. The objective for future GNSS satellites is to further reduce the ranging error to less than one meter.

As a result, satellites may be frequently uploaded (e.g., about once per day) with new ephemeris data sets to be broadcast by the satellites to conventional navigation devices. The nominally proposed solution to reduce errors for future GNSS is to upload new ephemeris data even more frequently, e.g. once per hour, or once every few hours. Each piecewise ephemeris data set typically covers a limited time interval (e.g., about 4 hours) which accounts for known and predictable forces (i.e., forces other than variable solar pressure or other unpredictable small forces), with successive ephemeris data sets that overlap by one or two hours.

Unfortunately, there are significant disadvantages to this approach. For example, due to limited broadcast data rates, each navigation satellite only broadcasts the "current" ephemeris data set, and then switches to a new "current" ephemeris data set broadcast about every two hours. Conventional navigation devices must then typically read the new "current" ephemeris data set about every two hours to maintain full accuracy. In particular, if the conventional navigation devices rely on stale ephemeris data sets, accumulated deviations between the actual satellite positions and the stale ephemeris data can result in significant navigation errors.

In addition, the above approach renders conventional navigation devices susceptible to navigation errors induced by the interruption of satellite ephemeris data broadcasts. Such interruptions may be caused, for example, by signal jamming, signal attenuation, line-of-sight blockage (e.g. urban canyon environments), weak Signal-to-Noise Ratio (SNR) conditions, or other forms of interference. While the navigation device can continue to make ranging measurements at very low signal power levels or with a short span of data of one second or less, strong signals are required to read new ephemeris information over the entire data broadcast interval of up to 30 seconds. In this regard, the navigation device may be configured to integrate the received signal for longer intervals of time to filter noise effects while making ranging measurements (e.g., one second), whereas the integration interval for demodulation of the broadcast ephemeris data is typically limited to 20 milliseconds due to the broadcast data rate of 50 Hz. The ratio of these two intervals (i.e., 50 or 17 dB), is an estimate of the relative weak signal capability advantage associated with making ranging measurements versus demodulating broadcast data.

In addition, once a navigation device is first turned on, it normally must read new ephemeris data from the satellites. The time delay to obtain a solution after the device is turned on is known as Time-to-First Fix (TTFF). The delay of about 30 seconds just to read this data often causes the TTFF to approach one minute for most stand-alone devices. Many users would prefer smaller TTFF of only a few seconds.

As a result, there is a need for an improved approach to satellite-based navigation that does not rely on frequent ephemeris updates to be received by conventional navigation devices. In particular, there is a need for a satellite-based navigation approach that may permit user devices to continue providing accurate position information for long intervals of time to improve TTFF and operational performance despite the possible presence of satellite signal interference, line-of-sight obstructions, signal attenuation, or weak signal conditions.

SUMMARY

In accordance with one embodiment of the present invention, a method of adjusting a navigation satellite orbit includes receiving a first set of tracking information for a navigation satellite; determining a nominal orbital path for the navigation satellite using the first set of tracking information; computing ephemeris data corresponding to the nominal orbital path; uploading the ephemeris data to the navigation satellite; transmitting long-term navigation information corresponding to the nominal orbital path to a communication system for broadcast to a plurality of navigation devices; receiving a second set of tracking information for the navigation satellite; predicting an orbital path of the navigation satellite using the second set of tracking information; determining a difference between the predicted orbital path and the nominal orbital path; and uploading commands to the navigation satellite, wherein the commands are configured to instruct the navigation satellite to adjust an actual orbital path of the navigation satellite to substantially conform to the nominal orbital path.

In accordance with another embodiment of the present invention, a method of providing satellite-based navigation at a navigation device includes receiving long-term navigation information from a communication system, wherein the long-term navigation information is associated with a nominal orbital path of a navigation satellite; estimating a position of the navigation satellite using the long-term navigation information; repeating the receiving and the estimating operations for a plurality of additional navigation satellites using long-term navigation information associated with each of the additional navigation satellites; and determining a position of a navigation device based on the estimated positions of the navigation satellite and the additional navigation satellites.

In accordance with another embodiment of the present invention, a navigation satellite includes a receive antenna adapted to receive a plurality of ephemeris data sets and commands, wherein the commands are configured to instruct the navigation satellite to adjust an actual orbital path of the navigation satellite to substantially conform to a nominal orbital path; a memory adapted to store the ephemeris data sets; a transmit antenna adapted to transmit the ephemeris data sets to a plurality of navigation devices; a plurality of propulsion actuators; and a processor adapted to control the propulsion actuators in response to the commands.

In accordance with another embodiment of the present invention, a navigation device includes means for receiving long-term navigation information from a communication system, wherein the long-term navigation information is associated with nominal orbital paths of a plurality of navigation satellites; and a processor adapted to: estimate positions of the navigation satellites using the long-term navigation information, and determine a position of the navigation device based on the estimated positions of the navigation satellites.

In accordance with another embodiment of the present invention, a method of adjusting a navigation satellite orbit includes determining a nominal orbital path of the navigation satellite; transmitting ephemeris data corresponding to the nominal orbital path from the navigation satellite to a plurality of navigation devices; determining an actual orbital path of the navigation satellite locally at the navigation satellite; determining a deviation between the actual orbital path and the nominal orbital path locally at the navigation satellite; and autonomously adjusting the actual orbital path locally at the navigation satellite to reduce the deviation between the actual orbital path and the nominal orbital path.

In accordance with another embodiment of the present invention, a navigation satellite includes a receive antenna adapted to receive ephemeris data from a ground station, wherein the ephemeris data corresponds to a nominal orbital path of the navigation satellite; a memory adapted to store the ephemeris data; a transmit antenna adapted to transmit the ephemeris data to a plurality of navigation devices; a plurality of propulsion actuators; and a processor adapted to: determine an actual orbital path of the navigation satellite, determine a deviation between the actual orbital path and the nominal orbital path, and command the propulsion actuators to adjust the actual orbital path to reduce the deviation between the actual orbital path and the nominal orbital path.

In accordance with another embodiment of the present invention, a navigation satellite includes means for determining a nominal orbital path of the navigation satellite; means for transmitting ephemeris data corresponding to the nominal orbital path from the navigation satellite to a plurality of navigation devices; means for determining an actual orbital path of the navigation satellite locally at the navigation satellite; means for determining a deviation between the actual orbital path and the nominal orbital path locally at the navigation satellite; and means for autonomously adjusting the actual orbital path locally at the navigation satellite to reduce the deviation between the actual orbital path and the nominal orbital path.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments of the present invention, orbit control may be used to eliminate or reduce the need for frequent short-term ephemeris data updates to be periodically provided to navigation devices from navigation satellites. In this regard, the trajectories of one or more navigation satellites may be controlled to follow nominal orbital paths corresponding to long-term navigation information.

In various embodiments, the use of long-term navigation information may enable accurate prediction of navigation satellite orbital paths by navigation devices for extended periods of time (e.g., longer than approximately 24 hours in one embodiment, and possibly several months in another embodiment where navigation satellite orbits are successfully controlled without interruption to follow predicted long-term nominal trajectories). As a result, navigation devices, once initialized with the long-term navigation information, may continue to provide relevant navigation position information to users despite the presence of jamming or other forms of interference that may interfere with the reception of satellite signals at the navigation devices.

In one embodiment, such long-term navigation information may be in the form of multiple sets of ephemeris data provided to navigation devices. In another embodiment, the long-term navigation information may be in the form of state vector data provided to the navigation devices.

Figure 1:
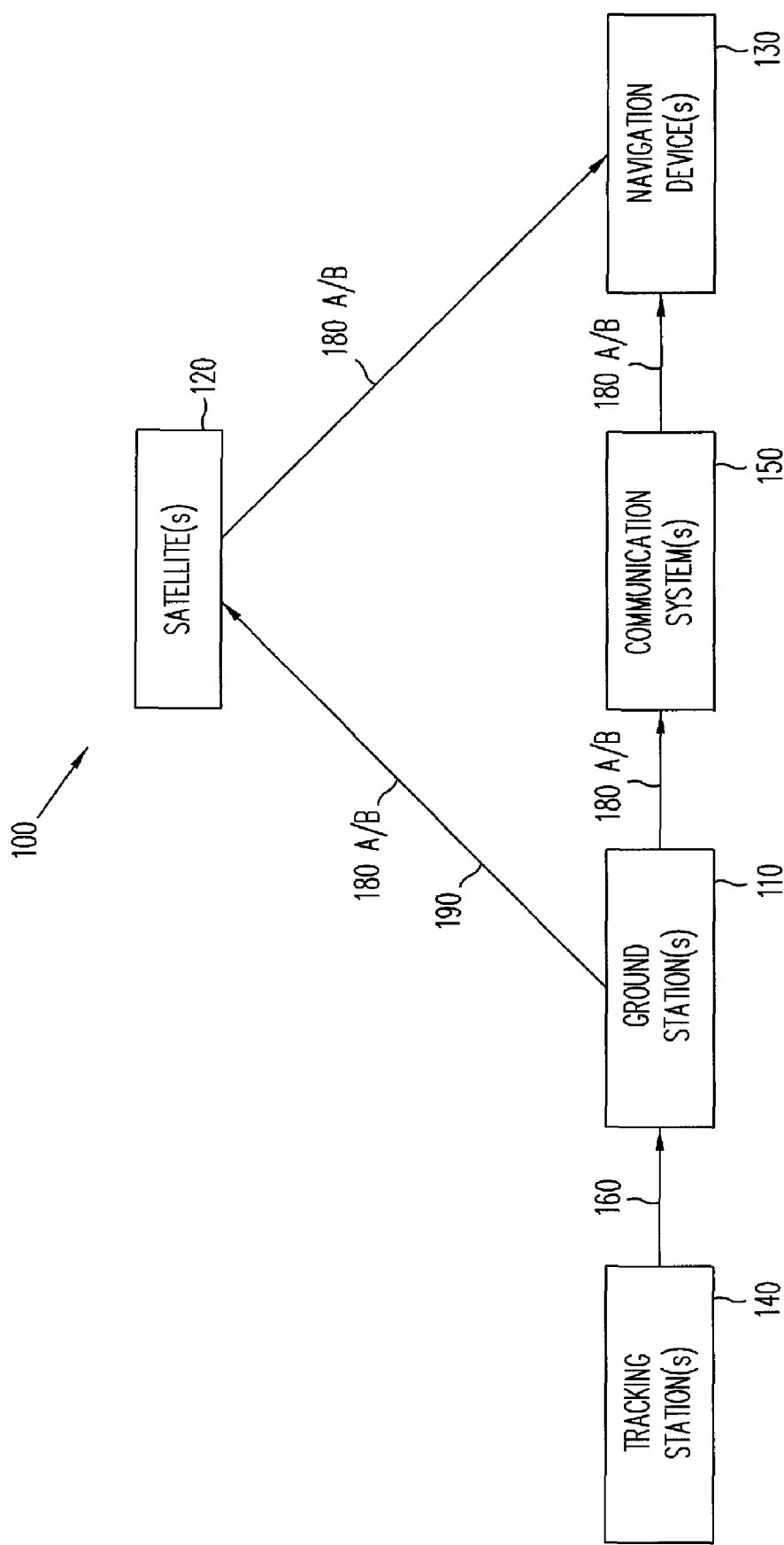
FIG. 1 shows a satellite-based navigation system in accordance with an embodiment of the present invention.

Referring now to the drawings wherein the showings are for purposes of illustrating embodiments of the present invention only, and not for purposes of limiting the same, FIG. 1 shows a satellite-based navigation system 100 in accordance with an embodiment of the present invention. As illustrated in FIG. 1, system 100 includes a ground station 110, a navigation satellite 120, a navigation device 130, a tracking station 140, and a communication system 150. Although a single one of each of the components of system 100 is illustrated in FIG. 1, it will be appreciated that system 100 may include a plurality of each of the illustrated components.

Tracking station 140 may be configured to measure the orbital range of satellite 120 and provide tracking information 160 to ground station 110. It will be appreciated that such tracking information 160 may be provided directly from tracking station 140 to ground station 110 and/or through one or more intermediate networks (not shown).

Ground station 110 may be configured with one or more appropriate processors and associated memories to perform various calculations. For example, ground station may be configured to perform orbital calculations based on tracking information 160 to determine a nominal orbital path for navigation satellite 120. In this regard, ground station 110 may compute long-term navigation information 180 corresponding to the nominal orbital path. For example, such long-term navigation information 180 may be in the form of ephemeris data 180A or state vector data 180B.

In one embodiment, ground station 110 may be configured to select a desired set of predicted forces affecting the orbital motion of navigation satellite 120. Ground station 110 may be further configured to integrate differential equations associated with the selected predicted forces, starting from an initial condition, to generate the nominal orbital path for navigation satellite 120. Subsequent corrections to the actual orbital patch of navigation satellite 120 may be made to adjust the actual orbital path to substantially compensate for deviations from the nominal orbital path caused by unpredicted forces such as, for example, solar radiation pressure.

As illustrated, ground station 110 may be further configured to transmit long-term navigation information 180 (as multiple sets of ephemeris data 180A or state vector data 180B) to communication system 150 for broadcast to a plurality of navigation devices 130. Ground station 110 may be further configured to periodically upload one or more sets of ephemeris data 180A or state vector data to navigation satellite 120. Whereas communication system 150 may be implemented with sufficient bandwidth to quickly transmit multiple sets of long-term navigation information 180 for the entire constellation of navigation satellites 120 to the navigation device 130, each navigation satellite 120, due to limited broadcast bandwidth, typically only broadcasts its "current" ephemeris parameter data set.

Ground station 110 may also be configured to predict an orbital path of navigation satellite 120 using tracking information 160 and determine differences between the predicted orbital path and nominal orbital path. In addition, ground station 110 may be configured to prepare and upload commands 190 to navigation satellite 120. Such commands 190 may be configured to instruct navigation satellite 120 to adjust its actual orbital path via thruster firings to substantially conform to the nominal orbital path.

Communication system 150 may be configured as any appropriate wired or wireless communication system or network which may be used to provide long-term navigation information 180 to navigation devices 130. For example, in one embodiment, communication system 150 may be implemented as a non-GNSS communication system. In another embodiment, communication system 150 may be implemented by the Internet or a conventional wireless network. In various embodiments, the transmission and broadcast of long-term navigation information 180 may be performed over a transmission channel other than that used by conventional (i.e., legacy) navigation devices and may optionally include secure methods of communication and encryption.

Navigation device 130 may be configured to receive long-term navigation information 180 from communication system 150 and/or navigation satellite 120. In this regard, navigation device 130 may include one or more antennas (not shown) for receiving satellite signals. Such antennas may also enable communication with communication system 150 and/or ground station 110 for requesting and/or receiving wireless signals including long-term navigation information 180. Navigation device may also include an appropriate data port to facilitate a direct wired connection with communication system 150 (e.g., to permit monthly or other periodic wired connections over the Internet using, for example, a docking cradle or cable).

Navigation device 130 may further include one or more appropriate processors and associated memories capable of processing received signals and for executing instructions stored in a machine-readable medium in order to determine the position, velocity, and time trajectory of navigation device 130 using long-term navigation information 180.

Navigation satellite 120 can be any type of spacecraft that may be used to receive long-term navigation information 180 and commands 190, transmit current data sets of long-term navigation information 180 to one or more navigation devices 130, and adjust its actual orbital path in response to commands 190.

Ground station 110 may compute long-term navigation information 180 corresponding to the nominal orbital path of navigation satellite 120 by accounting for acceleration forces affecting the orbit of navigation satellite 120. In this regard, the following Equation (1) may be used as a differential equation of motion to account for such acceleration forces to determine the nominal orbital path:

$$\frac{d^2 \vec{r}_{cg}}{dt^2} = \ddot{\vec{r}}_{cg} = -\frac{\mu}{r_{cg}^3}(\vec{r}_{cg}) + \vec{a}_E + \vec{a}_m + \vec{a}_s + \vec{a}_{sp}(\vec{e}, A_{sp}, \vec{S}) \quad (1)$$

The first term in Equation (1) represents the two-body dominant acceleration term due to Earth gravity, followed by the Earth harmonics and tides terms, each of which are a function of latitude, longitude, and altitude. The third and fourth terms represent gravity forces of the moon and sun, respectively. The last term of Equation (1) is the radiation pressure as a function of the satellite attitude (e), reflectivity and solar pressure model parameters (Asp, which depends on area), the distance to the sun, radiant output of the sun, and sun line direction (S).

Considering Equation (1), an ideal nominal trajectory of navigation satellite 120 would only consist of the dominant first term. With this selection, the ideal nominal orbital trajectory would consist of the closed-form two-body solution given by Kepler's equation. However, with this selection for the nominal trajectory, the propellant to control cancellation of all of the remaining force perturbations could be excessive.

In one embodiment, to keep propellant requirements small, generation of the nominal trajectory of the navigation satellite 120 by the ground station 110 may be based on all of the well-known, predictable forces in Equation (1), including all of the gravity perturbation terms and, if desired, the nominal solar pressure force. The major unpredictable force would then be associated with the uncertainty or error in the solar pressure model. Thus, with this selection for generation of the nominal trajectory, the thrust control action would only need to periodically correct for the small uncertainty in solar pressure effects. In one embodiment, the propellant consumption using high specific impulse thrusters only amounts to a few kilograms over 10 years.

In another embodiment, navigation satellite 120 autonomously controls itself to follow a nominal orbital path and compensate for solar pressure forces. In this case, ground station 110 or navigation satellite 120 may generate the nominal orbital path based on an initial position of navigation satellite 120. In such an embodiment, the nominal orbital path may be generated based on gravitational forces and not solar pressure forces. Accordingly, in this embodiment, the last term of equation 1 may be set to zero when generating the nominal orbital path.

There is no closed form solution for an ephemeris representation of navigation satellite 120 that remains accurate enough for most GNSS based navigation applications for time periods greater than several hours (i.e., due to secular variations in the orbital right ascension of the ascending node, perigee, and mean anomaly Keplerian parameters caused by the gravity of the moon, sun, and Earth harmonics). Accordingly, ground station 110 may be configured to generate long-term navigation information 180 that includes many sets of ephemeris data 180A, each of which may be valid for several hours, and adjacent data sets corresponding to consecutive, but possibly overlapping time intervals of the long-term nominal orbit trajectory. Advantageously, the effects of any other unpredictable perturbations beyond solar pressure (e.g., higher order terms from Polar Wander, Earth rotation, and initial velocity error) are also removed by daily uploaded commands 190 to bring the satellite trajectory back into approximate agreement with the nominal trajectory. In one embodiment, such ephemeris data 180A may also be used by conventional GPS/GNSS satellites if desired. In this regard, the GPS Master Control Station (MCS) Kalman filter, which operates to estimate GPS satellite orbit trajectories and clock states, could incorporate predicted small force effects of thrust commands into its orbital determination computations, and daily ephemeris uploads to the satellites would proceed as normally to continue to service conventional GPS satellite navigation messages and navigation devices without degradation.

In one embodiment, a limited number of ephemeris data 180A data sets (e.g., corresponding to ephemeris data used for approximately one day of successive ephemeris satellite broadcasts) may be uploaded to navigation satellite 120 on a daily basis. In another embodiment, a large number of ephemeris data 180A data sets (e.g., corresponding to more than one day of successive ephemeris satellite broadcasts) may be uploaded to navigation satellite 120 and transmitted to communication system 150 (for broadcast to navigation devices 130) at intervals greater than approximately 24 hours. However, whereas the high-bandwidth communication system 150 can transmit large number ephemeris data 180A data sets within a short interval or time, each navigation satellite 120 typically only broadcasts its "current" ephemeris data 180A data set due to limited bandwidth and operational constraints.

In one embodiment, ephemeris data 180A may be represented using existing GPS navigation messages. In this case, the amount of data provided for each successive ephemeris data 180A data set satellite broadcast may be only about 1000 bits. Accordingly, a large number of ephemeris data 180A data sets corresponding to ephemeris data used for approximately one month of successive ephemeris satellite broadcasts may be less than 1 Mbit for each navigation satellite 120. In one embodiment, communication system 150 may operate at a data rate of several megabits per second (Mbps). In such an embodiment, communication system 150 can quickly transmit a large number of ephemeris data 180A data sets to navigation device 130 within a short period of time. On the other hand, where navigation satellite 120 broadcasts data at a rate of 50 bps, navigation satellite 120 may only broadcast its "current" ephemeris data 180A data set to navigation device 130.

As previously discussed, long-term navigation information 180 may also be provided in the form of state vector data 180B, including the position, velocity, and solar pressure states of the satellite 120 at an epoch time. In this approach, long-term navigation information 180 may include one or more initial state vectors, nominal Earth Orientation Parameters, and nominal force models which may be used by navigation device 130 to compute nominal orbital path 330 in accordance with Equation (1) previously discussed above. Specifically, navigation device 130 may be configured to numerically integrate Equation (1) using an initial state vector and nominal force models to replicate the GPS MCS calculations for prediction of the nominal trajectory, and thus predict the trajectory of navigation satellite 120 at future times. In another embodiment, state vector data 180B may also be transmitted to navigation satellite 120 and subsequently broadcast by navigation satellite 120 to user device 130.

Figure 2:
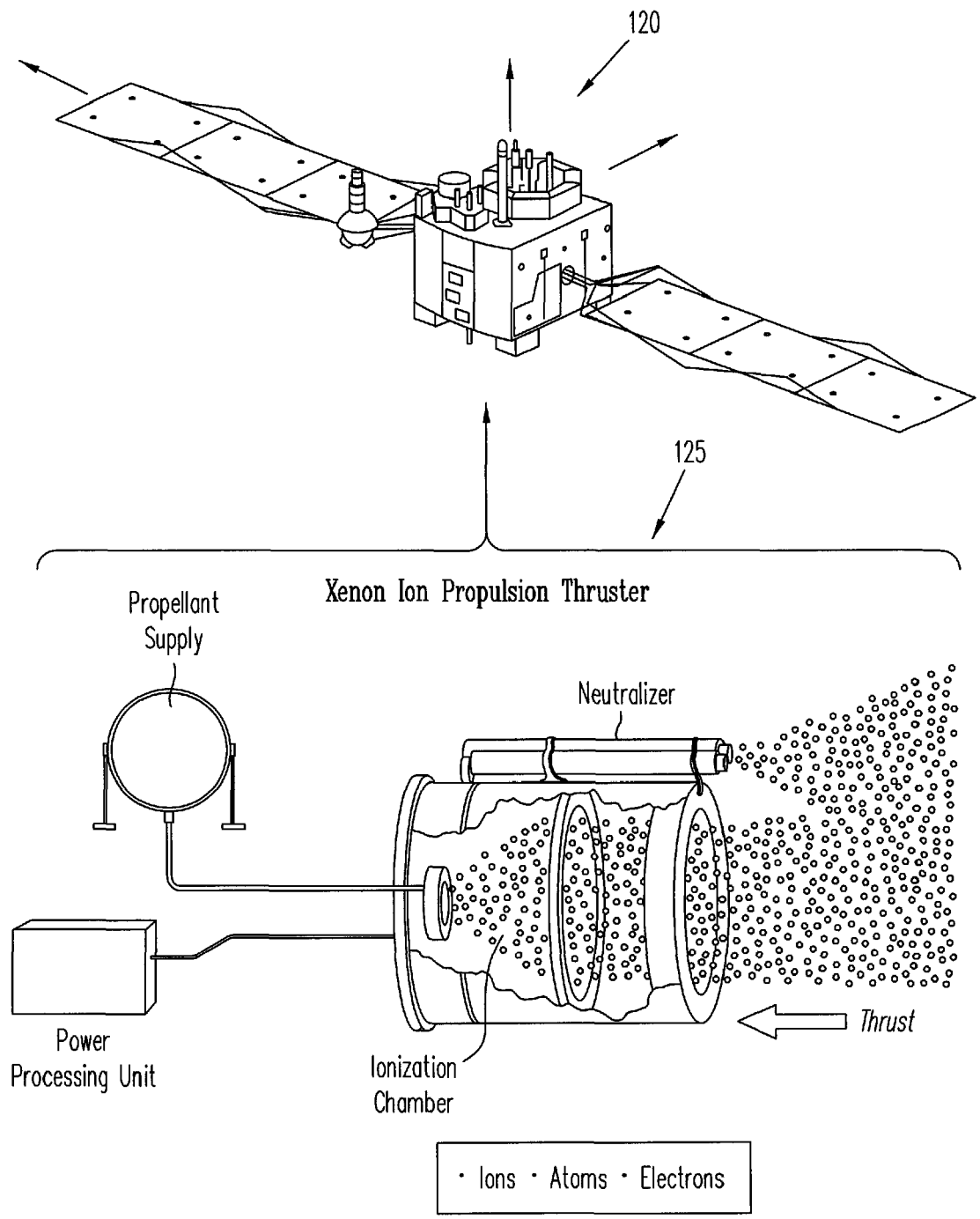
FIG. 2 shows an exemplary navigation satellite that may be subject to orbital control in accordance with an embodiment of the present invention.

FIG. 2 shows an embodiment of navigation satellite 120 that may be subject to orbital control in accordance with the present invention. In one embodiment, navigation satellite 120 may be implemented as a GPS or GNSS compatible satellite including a receive antenna adapted to receive ephemeris data 180A and/or state vector data 180B configured and formatted in accordance with the form of legacy GPS/GNSS ephemeris data uploads, as well as commands 190. In such an embodiment, navigation satellite 120 may further include a memory adapted to store ephemeris data 180A and/or state vector data 180A, and a transmit antenna adapted to transmit ephemeris data 180A and/or state vector data 180A to navigation device 130.

As shown, navigation satellite 120 includes one or more propulsion actuators (e.g., thrusters) 125 implemented, for example, as xenon ion propulsion thrusters (as illustrated), electric propulsion actuators, or other appropriate propulsion actuators. Such propulsion systems tend to be very low-thrust and very propellant efficient, and therefore are well-suited for providing a continuous-time counterforce to offset external small forces without causing either rotational or translational disturbances to navigation satellite 120.

Following is a calculation which may be used to estimate the amount of propellant used to cancel the effects of orbital disturbances induced by the solar pressure on one embodiment of navigation satellite 120. In this case, the dominant disturbing external force is the solar radiation pressure forces. Accordingly, the solar radiation force equation may be represented by the following Equation (2):

$$F_{solar} = -4.5 \times 10^{-6}(1+r)A, \quad (2)$$

where A is the satellite cross-sectional area exposed to the sun in m2, and r is a material reflection factor (where r=0 for absorption; r=1 for specular reflection at normal incidence).

In one embodiment, navigation satellite 120 may exhibit a total area of approximately 27.5 m2 that is exposed to the sun at any one time. In such an embodiment, the mass of navigation satellite 120 may be approximately 1700 kg. Using Equation (2), the solar pressure force may be roughly computed to be in the range of about 0.13 to about 0.25 milli Newton (mN) depending on the material properties of navigation satellite 120.

A 13 cm xenon ion thruster delivers about 18 mN of thrust with a very efficient thruster specific impulse (Isp) of 2600 sec. Such a thruster or a smaller thruster (e.g., about 3 cm diameter smaller) used for propulsion actuators 125 may be used to cancel the dominant solar pressure and other perturbation forces and provide satisfactory thrust with extra margin in order to maintain a desired orbital path in accordance with various embodiments of the invention discussed herein.

Figure 3:
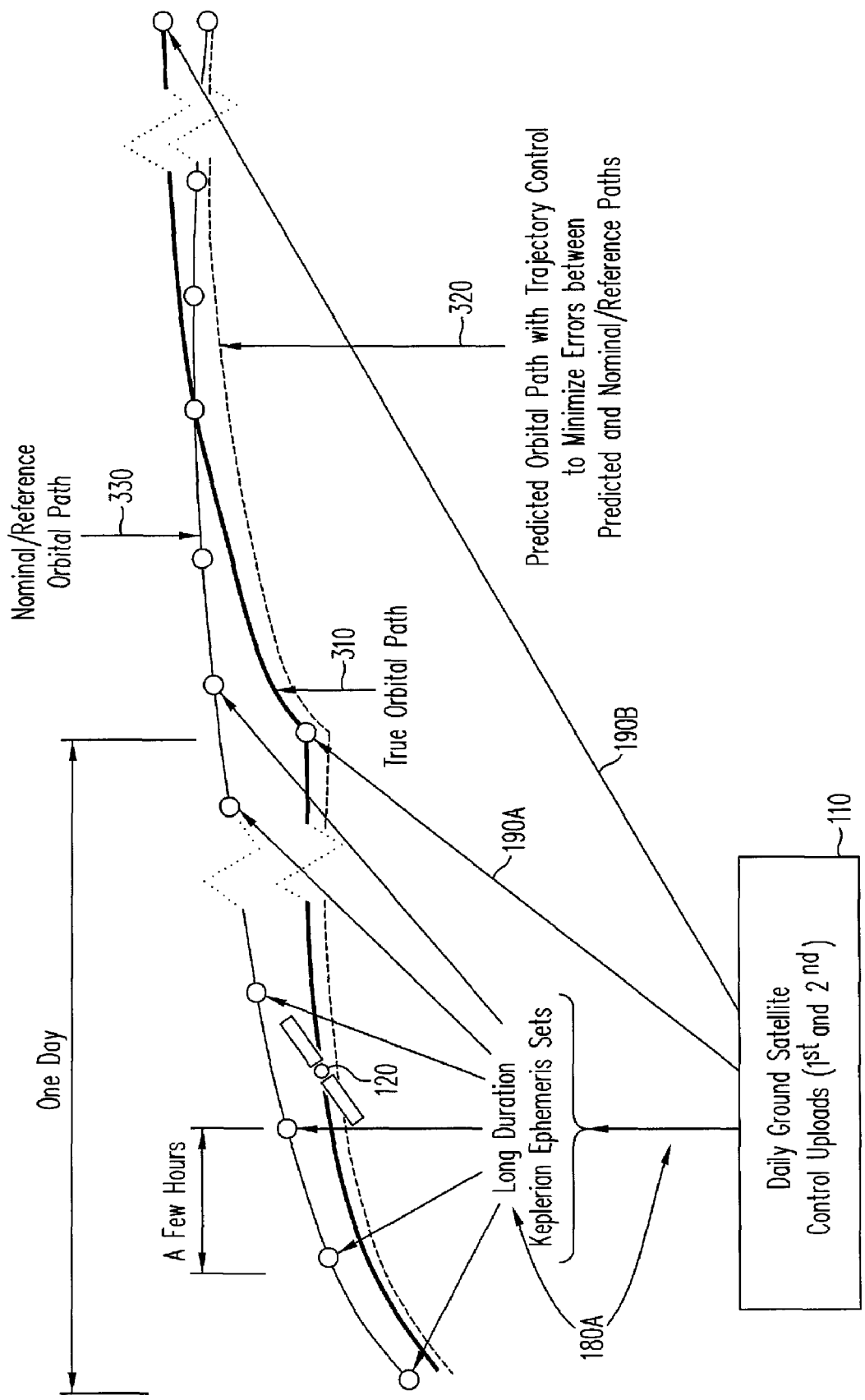
FIG. 3 shows a comparison of a true orbital path, a predicted orbital path, and a nominal orbital path in accordance with an embodiment of the present invention.

FIG. 3 shows a comparison of a true orbital path 310, a predicted orbital path 320, and a nominal orbital path 330 in accordance with an embodiment of the present invention. In this regard, true orbital path 310 represents the actual orbital path of navigation satellite 120 in space relative to the Earth. Predicted orbital path 320 represents the orbital path of navigation satellite 120 as measured by tracking station 140 and predicted by the ground station 110. In this regard, it will be appreciated that predicted orbital path 320 may deviate from true orbital path 310 due to measurement and prediction errors. Nominal orbital path 330 represents an orbital path conforming to long-term navigation information 180 provided by ground station 110.

As discussed above, ground station 110 may receive tracking information 160 from tracking station 140 and may compute long-term navigation information 180 in the form of ephemeris data 180A which is compatible with legacy GPS/GNSS systems. As shown in FIG. 3, ground station 110 may upload sets of ephemeris data 180A to navigation satellite 120 that include ephemeris data to be used every few hours in successive ephemeris satellite broadcasts. Navigation satellite 120 may continuously broadcast a current set of ephemeris data 180A and switch to broadcasting the next set of ephemeris data 180A every few hours (e.g., about every 2 hours).

As also previously discussed, ground station 110 may compute orbital path correction commands 190 to be uploaded to satellite 120 for control of propulsion actuators 125. In this regard, ground station 110 may upload commands 190 at intervals of, for example, approximately 24 hours. In response to each command upload operation, navigation satellite 120 may be configured to adjust its true orbital path 310 to align more closely with nominal orbital path 330. For example, as shown in FIG. 3, true orbital path 310 and predicted orbital path 320 of navigation satellite 120 may change in response to a first command upload operation (labeled 190A) which causes such orbital paths to more closely align with nominal orbital path 330. It will be appreciated that the operations illustrated in FIG. 3 may be repeated for all navigation satellites 120 in a given satellite constellation.

Figure 4:
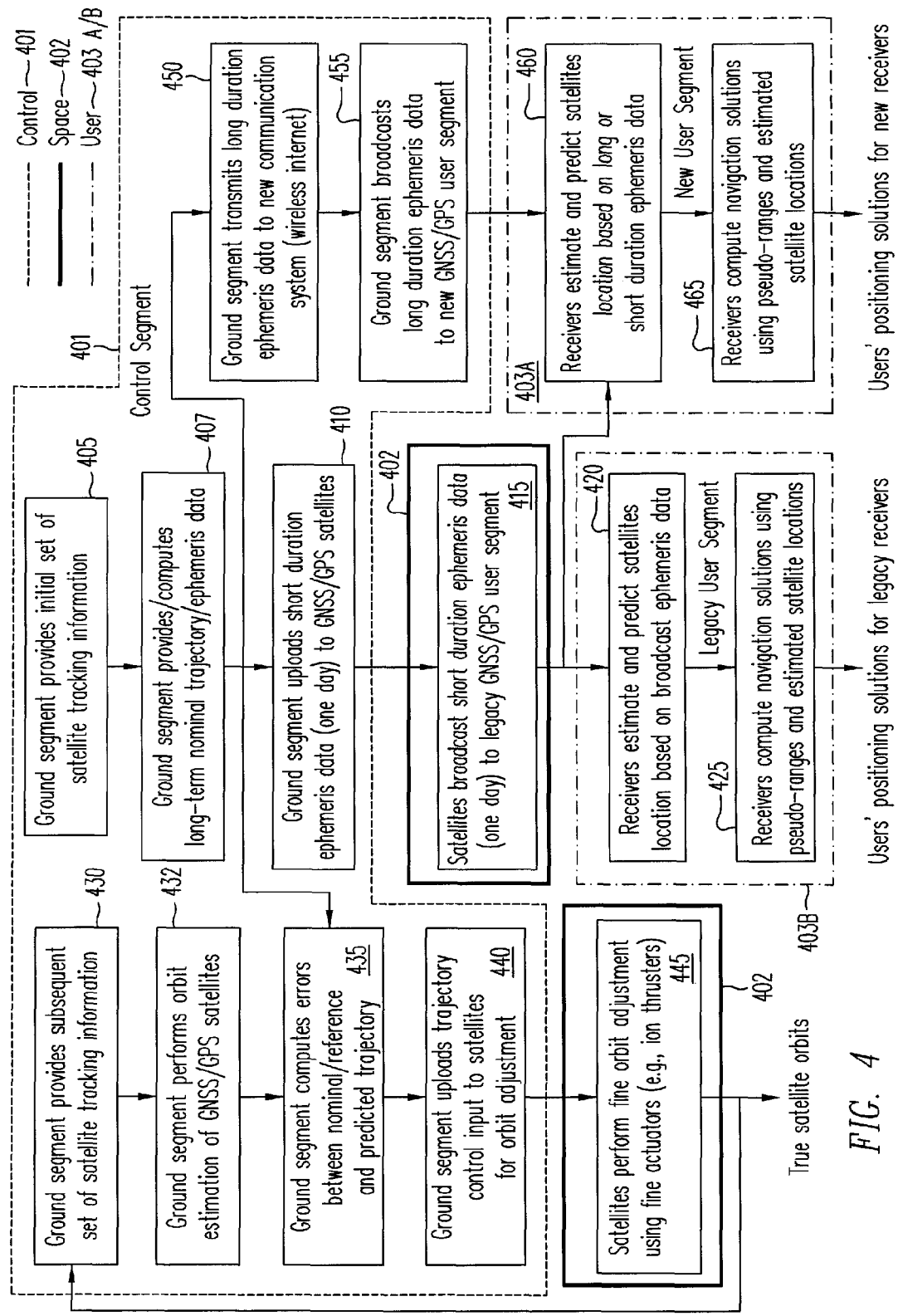
FIG. 4 is a flowchart showing operation of a satellite-based navigation system in accordance with an embodiment of the present invention.

FIG. 4 is a flowchart showing operation of satellite-based navigation system 100 in accordance with an embodiment of the present invention. As illustrated, the process of FIG. 4 includes four major segments: control segment 401, which corresponds substantially to operations performed by ground station 110, tracking station 140, and/or communication system 150; space segment 402, which corresponds substantially to operations performed by navigation satellite 120; new user segment 403A, which corresponds substantially to operations performed by navigation device 130 when using long-term navigation information 180 received from communication system 150; and legacy user segment 403B, which corresponds substantially to operations performed by navigation device 130 when using ephemeris data 180A received from navigation satellite 120.

Turning now to the particular operations of FIG. 4, in block 405, tracking station 140 measures predicted orbital path 320 of navigation satellite 120 and provides a corresponding initial set of tracking information 160 to ground station 110.

Then, in block 407, ground station 110 determines nominal orbital path 330 of navigation satellite 120 and computes long-term navigation information 180 in the form of ephemeris data 180A for nominal orbital path 330.

As shown in FIG. 4, the computations performed in block 407 may be used by subsequent blocks 410, 435, and 450. Turning now to block 410, ground station 110 uploads ephemeris data 180A to navigation satellite 120. In one embodiment, the upload operation of block 410 may be implemented as a daily upload of sets of ephemeris data 180A (data sets in this daily upload may also be referred to as short duration ephemeris data) corresponding to approximately one day of satellite broadcasts.

In block 415, a plurality of navigation satellites 120 periodically broadcast their current associated ephemeris data 180A to navigation device 130. In block 420, navigation device 130 estimates and predicts the position of the plurality of navigation satellites 120 using the broadcasted ephemeris data 180A in accordance with legacy GPS/GNSS techniques. Then, in block 425, navigation device 130 determines its own position based on the positions of the plurality of navigation satellites 120 determined in block 420. Accordingly, following block 425, navigation device 130 will have obtained its position using legacy-based GPS/GNSS navigation techniques.

Turning now to block 450, ground station 140 transmits long-term navigation information 180 in the form of ephemeris data 180A to communication system 150. In one embodiment, the transmit operation of block 450 may include a large number of sets of ephemeris data 180A (this large number of data sets may also be referred to as long duration ephemeris data) corresponding to a portion of nominal orbital path 330 spanning greater than one day, and possibly several months. In block 455, communication system 150 broadcasts the long duration ephemeris data to navigation device 130 through, for example, a wireless network, the Internet, wired connection, or another desired non-GNSS based communication channel (block 455).

In one embodiment, navigation device 130 may be selectively authorized to receive long-term navigation information 180 from communication system 150. In this regard, it is contemplated that navigation device 130 may subscribe, for example, to a fee-based service which may authorize navigation device 130 to receive long-term navigation information 180.

In block 460, navigation device 130 may estimate and predict the position of the plurality of navigation satellites 120 using ephemeris data 180A received either from the broadcast by navigation satellites 120 in block 415 or from the broadcast by communication system 150 in block 455. In this regard, it will be appreciated that navigation device 130 may select whether to use ephemeris data 180A received from navigation satellite 120 or from communication system 150, depending on whether communications from navigation satellite or communication system 150 are currently available. For example, if navigation device 130 is unable to receive ephemeris data 180A from navigation satellite 120 due to jamming, interference, or other conditions, navigation device 130 may still be able to receive ephemeris data 180A from communication system 150.

Navigation device 130 may also choose to use ephemeris data 180A received from communication system 150 to reduce TTFF. Because the transmit operation of block 450 may include ephemeris data 180A corresponding to a portion of nominal orbital path 330 spanning greater than one day and possibly several months, navigation device 130 may continue to use such data for an extended period of time (e.g., longer than 24 hours, and possibly several months) if satellite signals remain interrupted.

In block 465, navigation device 130 determines its own position based on the positions of the plurality of navigation satellites 120 determined in block 460. Accordingly, following block 425, navigation device 130 will have obtained its position using either legacy-based GPS/GNSS navigation techniques or long-term navigation information 180 broadcast by communication system 150. In one embodiment, navigation device 130 may be configured to check the consistency of long duration ephemeris data available from communication system 150 and short duration ephemeris data available from navigation satellite 120.

Turning now to block 430, tracking station 140 measures predicted orbital path 320 of navigation satellite 120 and provides a corresponding subsequent set of tracking information 160 to ground station 110. Then, in block 432, ground station 110 estimates predicted orbital path 320 of navigation satellite 120 based on the subsequent set of tracking information 160. It will be appreciated that block 430 may be performed at a later time than block 405 previously discussed above. Accordingly, because navigation satellite 120 is in motion, the subsequent set of tracking information 160 provided in block 430 may differ from the initial set of tracking information 160 provided in block 405. As a result, in block 435, ground station 110 determines a difference between predicted orbital path 320 (which was provided in block 432) and nominal orbital path 330 (which was provided in block 407).

In block 440, ground station 110 prepares commands 190 that are configured to instruct navigation satellite 120 to adjust its true orbital path 310 to substantially conform to nominal orbital path 330, and uploads commands 190 to navigation satellite 120. In response, navigation satellite 120 executes commands 190 using one or more appropriate processors and propulsion actuators to adjust its true orbital path 310 accordingly. Following block 445, the process of FIG. 4 may loop back to block 430 in which additional sets of tracking information 160 may be provided to ground stations 110, and the true orbital path 310 of navigation satellite 120 may be iteratively adjusted to substantially conform to nominal orbital path 330.

It will be appreciated that following block 445; true orbital path 310 of navigation satellite 120 may be moved to substantially conform to nominal orbital path 330. As a result, ephemeris data 180A previously calculated in block 407 and broadcast to navigation devices 130 in blocks 415 and 455, respectively, may continue to be an accurate representation of the position of navigation satellite 120. It will further be appreciated that, where appropriate, the various operations discussed in the blocks of FIG. 4 may be performed for all navigation satellites 120 in a given satellite constellation.

In another embodiment, the process of FIG. 4 may be modified to use state vector data 180B. In this regard, ground station 110 may also compute state vector data 180B for nominal orbital path 330 in block 407, and then upload and transmit state vector data 180B in place of ephemeris data 180A in blocks 410 and 450, respectively. Similarly, navigation satellite 120 and communication system 150 may broadcast state vector data 180B (which may also include navigation satellite 120 solar pressure nominal force model data) in place of ephemeris data 180A in blocks 415 and 455. In one embodiment, state vector data 180B uploaded to, and broadcast from navigation satellite 120 may be "current" state vector data 180B of limited duration.

Also in this embodiment, in block 460, navigation device 130 may estimate and predict the position of the plurality of navigation satellites 120 using either ephemeris data 180A or state vector data 180B. If state vector data 180B is used, then navigation device 130 may determine the positions of the plurality of navigation satellites 120 using state vector data 180B instead of ephemeris data 180A. Then, in block 465, navigation device 130 may determine its own position based on the positions of the plurality of navigation satellites 120 determined in block 460.

In accordance with additional embodiments of the present invention, navigation satellites 120 may be further configured to perform autonomous onboard orbit control to follow nominal orbital paths corresponding to long-term navigation information 180. For example, navigation satellites 120 may be configured with sensors, such as drag free sensors, to permit navigation satellites 120 to locally measure the effects of external disturbances due to non-gravitational forces (e.g., solar pressure forces). Such measurements can be used by navigation satellites 120 to locally determine their actual orbital paths. In another embodiment, the actual orbital paths may be determined locally at navigation satellites 120 using suitable navigation devices, such as GPS-compatible navigation devices. Navigation satellites 120 may calculate differences between the true orbital paths and the nominal orbital paths corresponding to long-term navigation information 180.

As previously discussed, in one embodiment, the nominal orbital paths of navigation satellites 120 may be determined based on gravitational forces and not solar pressure forces. Because gravitational forces are well-known, the nominal orbital path of each navigation satellite 120 can be precisely determined for long durations of time using appropriate gravity models and/or initial state vectors. As a result, navigation satellites 120 can be configured to autonomously adjust their true orbital paths to more closely correspond to the nominal orbital paths by, for example, autonomously commanding their associated propulsion actuators 125.

Figure 5:
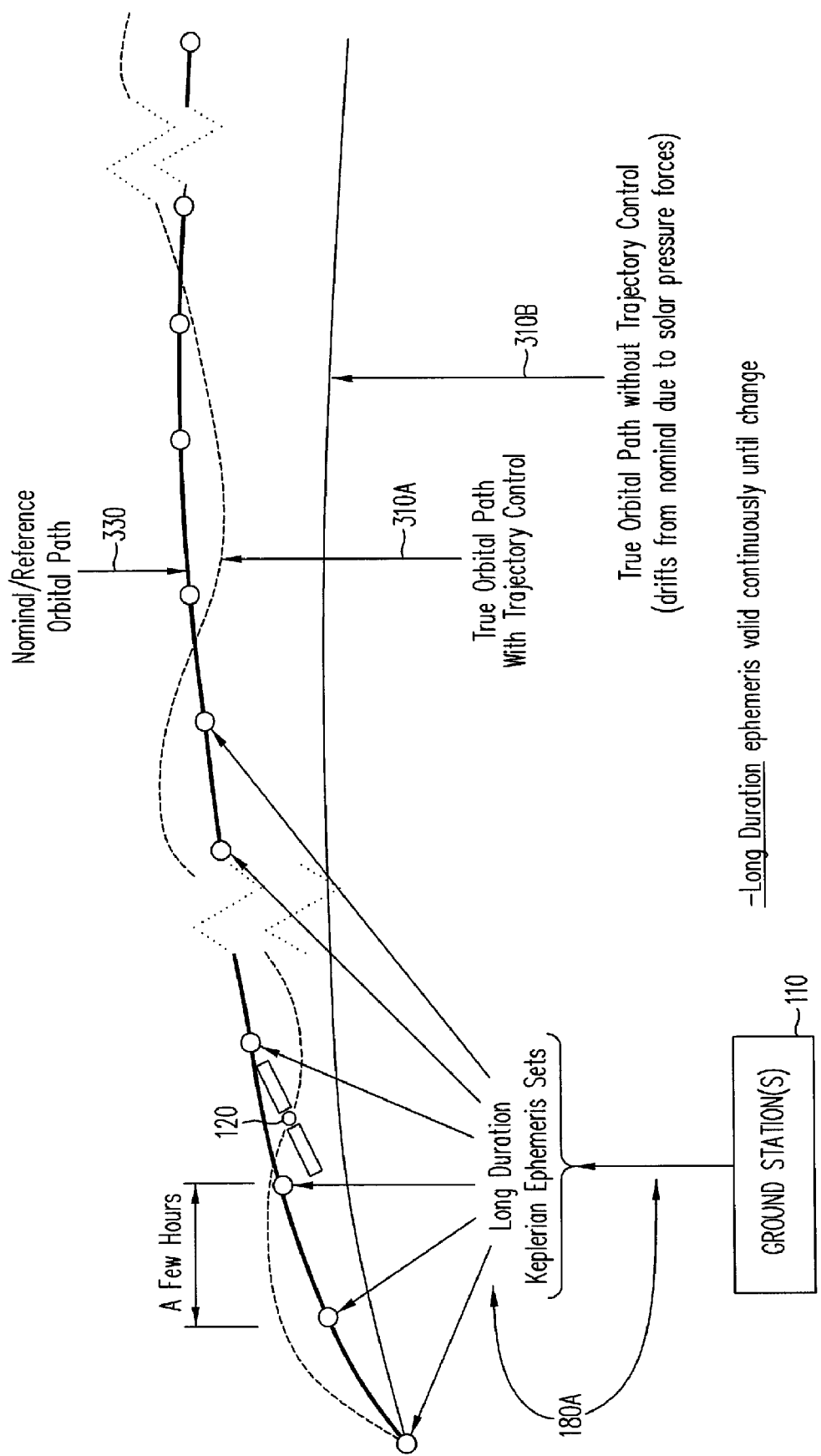
FIG. 5 shows another comparison of various orbital paths in accordance with an embodiment of the present invention.

FIG. 5 shows a comparison of various orbital paths in accordance with an embodiment of the present invention. It will be appreciated that FIG. 5 exhibits similarities with FIG. 3 described herein. However, in FIG. 5, navigation satellite 120 is further configured to perform autonomous onboard trajectory corrections. In this embodiment, navigation satellite 120 is configured with an on-board sensor. Accordingly, trajectory errors between an orbital path estimated from the sensor measurements and true orbital path 310A or 310B is negligible. As a result, the orbital path estimated by navigation satellite 120 using the on-board sensor may substantially correspond to true orbital path 310A or 310B.

In this regard, FIG. 5 shows a comparison of true orbital paths 310A-B and nominal orbital path 330. As previously described with regard to FIG. 3, nominal orbital path 330 represents an orbital path conforming to long-term navigation information 180 provided by ground station 110 (illustrated in FIG. 6 as ephemeris data 180A). In FIG. 5, true orbital path 310A is the actual orbital path of navigation satellite 120 when implemented and operating to perform autonomous onboard trajectory corrections. In contrast, true orbital path 310B is the actual orbital path of navigation satellite 120 when not implemented or not operating to perform autonomous onboard trajectory corrections.

As shown in FIG. 5, true orbital path 310B deviates from true orbital path 310A due to the drift of navigation satellite 120 caused by solar pressure forces. For example, in an embodiment where navigation satellite 120 does not perform autonomous onboard trajectory corrections, navigation satellite 120 may drift from nominal orbital path 330 until ground station 110 issues an appropriate command 190 (for example, after a time interval) to navigation satellite 120 to adjust its true orbital path 310B (e.g., through firings of propulsion actuators 125) to substantially conform to nominal orbital path 330. In contrast, where navigation satellite 120 does perform autonomous onboard trajectory corrections, navigation satellite 120 may periodically, continuously, or frequently adjust its true orbital path 310A to substantially align with nominal orbital path 330. It will be appreciated that the operations illustrated in FIG. 6 may be repeated for all navigation satellites 120 in a given satellite constellation.

Figure 6:
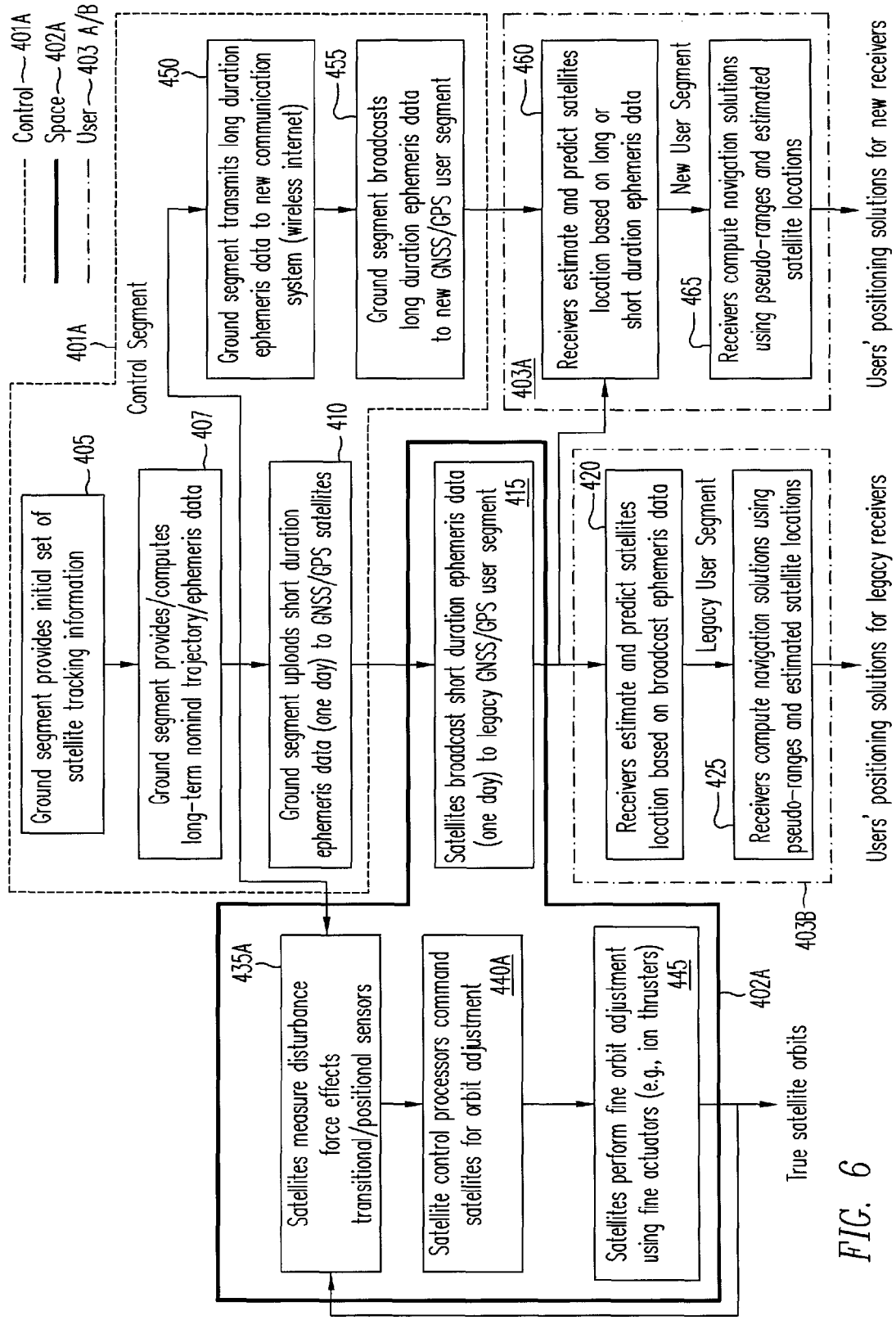
FIG. 6 is another flowchart showing operation of a satellite-based navigation system in accordance with an embodiment of the present invention.

FIG. 6 is another flowchart showing operation of a satellite-based navigation system in accordance with an embodiment of the present invention. It will be appreciated that portions of the flowchart of FIG. 6 correspond to portions of the flowchart of FIG. 3 and operate as previously described with regard to FIG. 3. In FIG. 6, navigation satellite 120 is further configured to perform autonomous onboard trajectory corrections. As a result, the particular operations performed in control segment 401A and space segment 402A of FIG. 6 differ from control segment 401 and space segment 402 of FIG. 3. In particular, control segment 401A does not include blocks 430, 432, 435, and 440. Rather, blocks 430 and 432 have been removed in FIG. 6. In addition, new blocks 435A and 440A are included in space segment 402A.

In block 435A, navigation satellite 120 measures its true orbital path 310A. In one embodiment, such measurement may be performed by measuring non-gravitational disturbance force effects using translational and/or positional sensors provided locally at navigation satellite 120 to determine a relative position of navigation satellite 120. For example, navigation satellite 120 may be implemented to measure solar pressure forces using a drag-free sensor in block 435A. In another embodiment, such measurement may be performed by measuring an actual position of navigation satellite 120 using a navigation device onboard navigation satellite 120.

Also in block 435A, navigation satellite 120 may determine nominal orbital path 330 using ephemeris data 180A received from ground station 110. In addition, in block 435A, navigation satellite 120 may determine the deviation of its true orbital path 310A from nominal orbital path 330, both of which may be determined as discussed herein.

Thereafter, in block 440A, navigation satellite 120 prepares commands that are configured to instruct navigation satellite 120 to adjust its true orbital path 310A to substantially conform to nominal orbital path 330. In response, navigation satellite 120 executes these commands in block 445 to adjust its true orbital path 310A accordingly. Following block 445, the process of FIG. 4 may loop back to block 435A where navigation satellite 120 continues to measure disturbance forces. It will be appreciated that navigation satellite 120 may continuously perform the operations of blocks 435A, 440A, and 445 to autonomously adjust true orbital path 310A to substantially correspond to nominal orbital path 330. It will further be appreciated that, where appropriate, the various operations discussed in the blocks of FIG. 4 may be performed for all navigation satellites 120 in a given satellite constellation.

In another embodiment, the process of FIG. 6 may be modified to use state vector data 180B as similarly described with regard to FIG. 4. For example, navigation satellite 120 may be configured to periodically receive satellite state vector data (for example, describing the a current state of true orbital path 310A), state vector covariance data (for example, describing covariance of the satellite state vector data), and force model data (for example, describing a gravitational force model of navigation satellite 120) from ground station 110 in block 435A. A processor (for example, processor 121 described herein) of navigation satellite 120 may be configured to determine nominal orbital path 330 using such satellite state vector data, state vector covariance data, and force model data.

Also in block 435A, a processor of navigation satellite 120 (for example, processor 121 described herein) may be configured to determine ephemeris data 180A using nominal orbital path 330 also determined in block 435A. In this regard, navigation satellite 120 may be configured to broadcast such locally-determined ephemeris data 180A to appropriate navigation devices 130 (for example, for broadcast in block 415). It will be appreciated that such an approach permits navigation satellite 120 to continue to operate autonomously to provide navigation service to navigation devices 130 for long periods of time, for example in the case of loss of ground contact.

Figure 7:
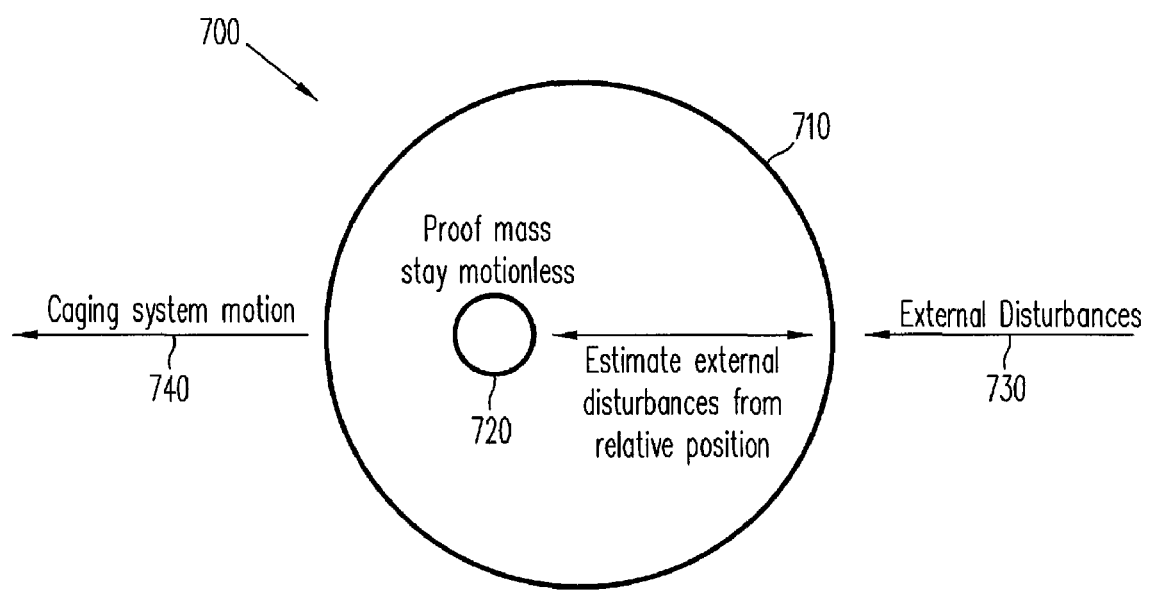
FIG. 7 shows a drag free sensor in accordance with an embodiment of the present invention.

FIG. 7 shows a conceptual block diagram of a drag free sensor 700 that may be implemented as part of navigation satellite 120 in accordance with an embodiment of the present invention. As shown in FIG. 7, drag free sensor 700 includes a proof mass 720 positioned inside a vacuum caging system 710. Vacuum caging system 710 and proof mass 720 may both be implemented, for example, with substantially spherical shapes. External disturbances 730 (e.g., such as solar pressure or air drag) incident on vacuum caging system 710 can cause vacuum caging system 710 (and navigation satellite 120 in which it may be implemented) to move in the direction of arrow 740. However, because vacuum caging system 710 is closed, proof mass 720 is shielded from external disturbances 730, but is still affected by gravity forces.

Drag free sensor 700 can be implemented to sense the displacement of proof mass 720 within vacuum caging system 710, and this information may be used to control propulsion actuators 125 of navigation satellite 120 to keep proof mass 720 centered within vacuum caging system 710. As a result, navigation satellite 120 may be affected by disturbances that act on proof mass 720 (e.g., forces due to gravity only), whereas other external disturbances 730, such as solar radiation pressure and air drag, may be canceled by the operation of propulsion actuators 125 based on measurements provided by drag free sensor 700. Because gravity forces are generally well known, the orbital motion of navigation satellite 120 can be predicted to a very high accuracy for long periods of time.

Figure 8:
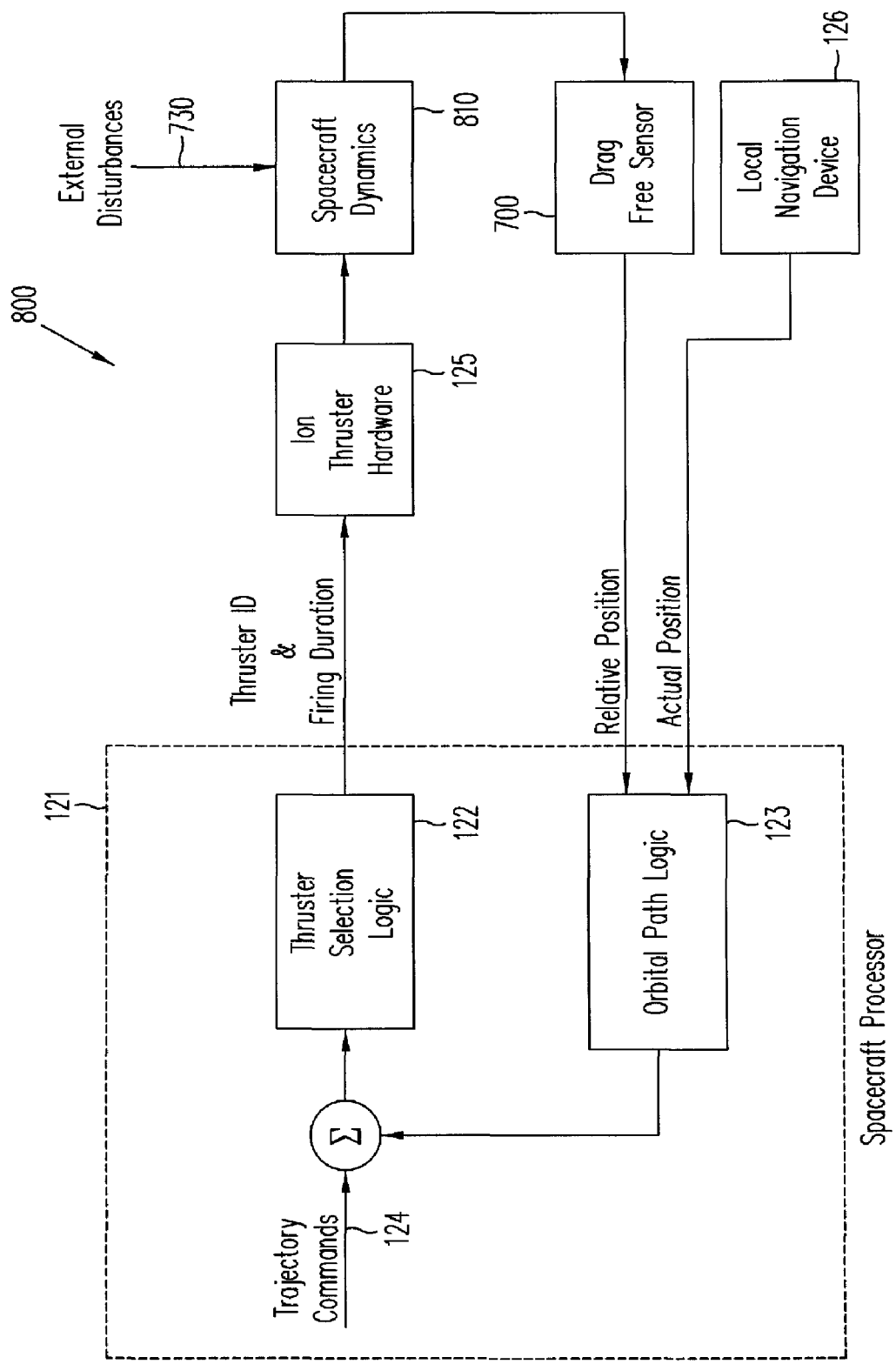
FIG. 8 shows a drag free sensor control system in accordance with an embodiment of the present invention.

FIG. 8 shows a drag free sensor control system 800 of navigation satellite 120 that may be used with drag free sensor 700 in accordance with an embodiment of the present invention. As shown in FIG. 8, control system 800 provides a feedback relationship in which drag free sensor 700 may detect changes in the position of navigation satellite 120 caused by the operation of propulsion actuators 125 and external disturbances 730. Such changes are conceptually represented in FIG. 8 as spacecraft dynamics 810. Signals from drag free sensor 700 are provided to a processor 121 of navigation satellite 120 that commands propulsion actuators 125, which in turn can again affect spacecraft dynamics 810.

For example, in one embodiment, the offset of proof mass 720 from the center of vacuum caging system 710 may be used as feedback to processor 121 to generate an error signal received by processor 121 that causes processor 121 to operate propulsion actuators 125 in response thereto. In this regard, the direction and magnitude of thrust provided by propulsion actuators 125 can be controlled by processor 121 to move navigation satellite 120 to keep proof mass 720 substantially centered within vacuum caging system 710. As a result, navigation satellite 120 can be controlled to substantially follow a gravitational trajectory.

Processor 121 is shown implemented with thruster selection logic 122 and orbital path logic 123. However, it will be appreciated that processor 121 may be implemented as one or more processors with any desired number or types of logic blocks to perform various steps and processes described herein.

Thruster selection logic 121 may be configured to command propulsion actuators 125 in response to trajectory command signals 124 and signals provided by orbital path logic 123. Trajectory command signals 124 may be used to provide a reference trajectory, orbit adjustment, and to cancel bias errors (e.g., in the event that a rapid station keeping maneuver needs to be performed, trajectory command signals 124 can override signals provided by orbital path logic 123). For example, in one embodiment, trajectory command signals 124 may be provided by commands 190 from ground station 110.

As shown, signals provided by drag free sensor 700 indicate a relative position of navigation satellite 120. Orbital path logic 123 may use the relative position signals provided by drag free sensor 700 to estimate the force, rate, and trajectory changes caused by external disturbances 730 and propulsion actuators 125 to determine true orbital path 310A, determine a deviation between true orbital path 310A and nominal orbital path 330, and prepare appropriate thruster commands provided to thruster selection logic 122 to appropriately command propulsion actuators 125 to counteract such changes. As a result, navigation satellite 120 can autonomously adjust true orbital path 310A to reduce the deviation between true orbital path 310A and nominal orbital path 330.

In another embodiment, navigation satellite 120 may further include an onboard local navigation device 126 which may be used by navigation satellite 120 to determine its actual position in space. Local navigation device 126 may be configured as any type of device suitable for tracking the position of navigation satellite 120. For example, in one embodiment, local navigation device 126 may be implemented as GPS-compatible device. As shown in FIG. 8, local navigation device 126 may provide processor 121 with the actual position of navigation satellite 120. Accordingly, orbital path logic 123 may be configured to use the actual position signals provided by local navigation device 126 to determine true orbital path 310A, determine a deviation between true orbital path 310A and nominal orbital path 330, and prepare appropriate thruster commands provided to thruster selection logic 122 to appropriately command propulsion actuators 125 to counteract such changes. As a result, navigation satellite 120 can autonomously adjust true orbital path 310A to reduce the deviation between true orbital path 310A and nominal orbital path 330.

Gravity forces on a distributed body in orbit such as navigation satellite 120 produce a net acceleration effect acting at the body's center of gravity. Accordingly, in one embodiment, navigation satellite 120 may be implemented to maintain drag free sensor 700 at the center of gravity of navigation satellite 120. However, the center of gravity of navigation satellite 120 can change over time as propellant is consumed. The center of gravity is also the center of rotation for navigation satellite 120. If proof mass 720 were not located at the center of gravity (e.g., the center of mass of navigation satellite 120), proof mass 720 would tend to migrate towards or contact a wall of vacuum caging system 710 due to centrifugal effects. Accordingly, navigation satellite 120 may be implemented to adjust the position of drag free sensor 700 as the center of gravity changes.

Figure 9:
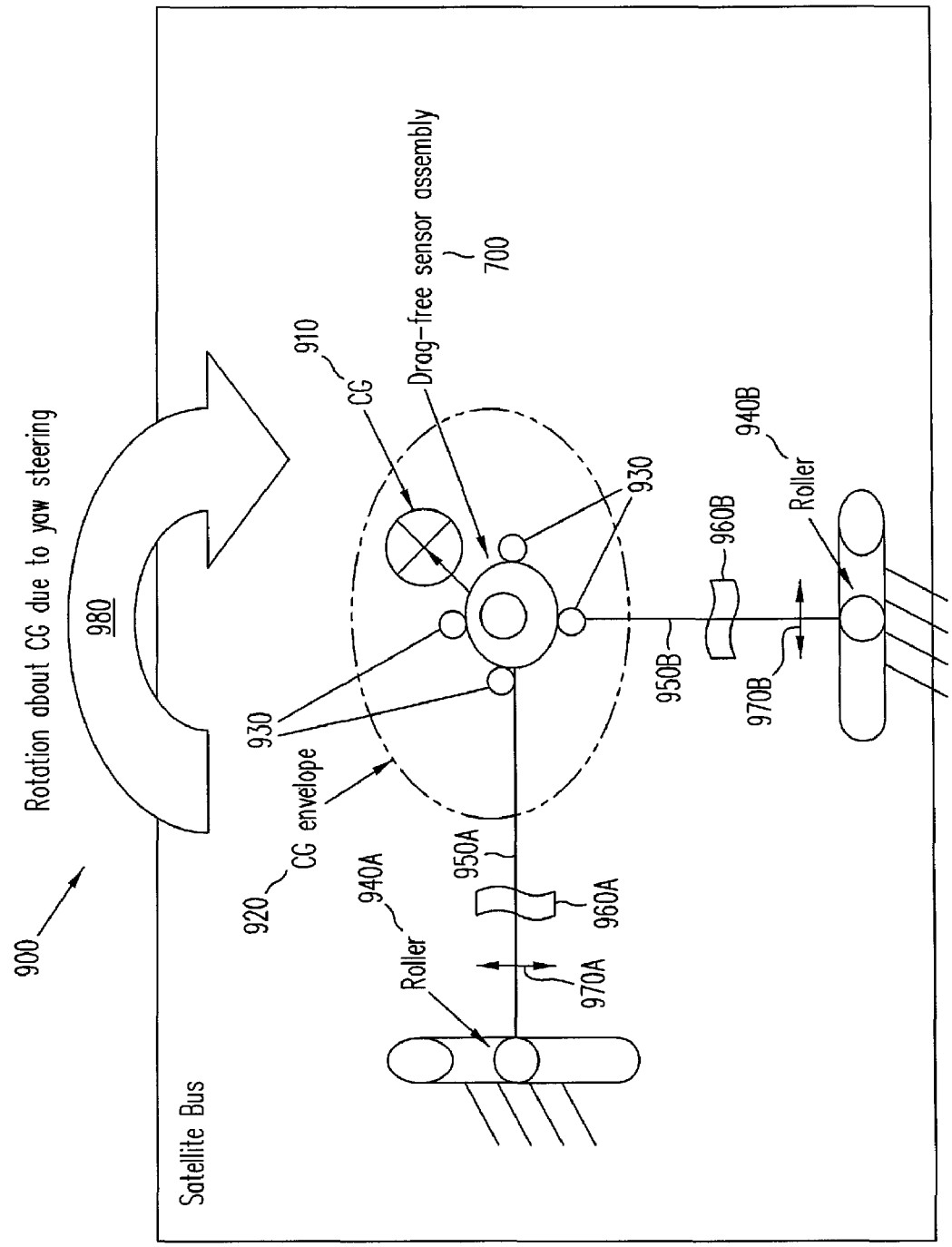
FIG. 9 shows a drag free sensor and actuator assembly in accordance with an embodiment of the present invention.

In this regard, FIG. 9 shows a drag free sensor and actuator assembly 900 that may be implemented as part of navigation satellite 120 to maintain drag free sensor 700 at a center of gravity 910 of navigation satellite 120 in accordance with an embodiment of the present invention. As shown in FIG. 9, navigation satellite 120 may rotate about a center of gravity 910 due to yaw steering 980 of navigation satellite 120. In addition, center of gravity 910 may move within an envelope 920 during the course of operation of navigation satellite 120 as propellant is consumed. Accordingly, assembly 900 may be configured to adjust the position of drag free sensor 700 within envelope 920 to correspond with center of gravity 910.

As also shown in FIG. 9, assembly 900 includes a plurality of inertial angular motion sensors 930 mounted on drag free sensor 700. Sensors 930 may be implemented, for example, as gyroscopes, accelerometers, or other types of sensors configured to measure angular motion of drag free sensor 700. Drag free sensor 700 is connected with sensor actuators 960 and rollers 940 through extendable members 950. In this regard, sensor actuators 960A and 960B may operate in response to sensors 930 to move extendable members 950A and 950B in the directions of arrows 970A and 970B, respectively. As a result, drag free sensor 700 may be moved toward a center of gravity 910 of navigation satellite 120 in response to angular motion measured by sensors 930. In one embodiment, drag free sensor 700 may correspond to center of gravity 910 when the sum of acceleration vectors measured by sensors 930 is approximately zero.

It will be appreciated that an improved approach to satellite-based navigation in accordance with various embodiments disclosed herein can accurately predict the trajectories and orbital paths of navigation satellites for long periods of time (for example, several months or more), without requiring navigation devices to rely on ephemeris data broadcast directly from such navigation satellites.

Advantageously, navigation devices configured in accordance with such embodiments may obtain long-term navigation information prior to start of a navigation-dependent mission, and may continue to use such long-term navigation information in the event that navigation satellite transmissions are interrupted or corrupted by signal jamming or weakened by interference due to line-of-sight obstruction (e.g., in urban canyon environments) or multi-path problems.

Additionally, because such navigation devices may already be in possession of the long-term navigation information, such devices may achieve a faster TTFF lock on satellite navigation signals after turn on than legacy-based navigation devices. In this condition, as soon as time has been determined, a navigation device can compute a position fix. For example, a navigation device in accordance with one embodiment of the invention may provide a TTFF of only a few seconds while, in contrast, a legacy-based navigation device may provide a TTFF of about 40 seconds or so since 30 seconds are required to read new ephemeris data as broadcast from navigation satellites.

A navigation device in accordance with one embodiment of the invention may advantageously be implemented such that access time to long-term navigation information stored in onboard memory may be significantly shorter than acquisition of data broadcast from navigation satellites. The access frequency of the ephemeris data may also be substantially improved (i.e., ephemeris data may be accessed about once every two hours from navigation satellite 120, whereas an access of once per week or once per month may be sufficient from communication system 150). This contrasts with conventional devices which may need to wait until a new data set page is broadcast every two hours (e.g., in 20-30 second repeat intervals), or when a new satellite appears above the horizon.

Civilian users may benefit from using embodiments of the present invention in urban canyon and indoor environments, when legacy signal attenuation, line-of-sight obstructions, and multi-path effects may compromise or corrupt the legacy GPS broadcast data. Therefore, navigation devices may obtain faster TTFF in these environments. Furthermore, wireless service providers (e.g. cell phone operators) may experience reduced data rate loads in associated GPS wireless assist networks due to less frequent ephemeris data updates.

Advantageously, in one embodiment, conventional navigation devices may continue to receive long-term navigation information as ephemeris data from navigation satellites in compatible legacy GPS/GNSS formats. In another embodiment, such conventional navigation devices may be modified to accommodate the storage of long duration ephemeris data sets and use long duration sets of ephemeris data rather than relying on legacy satellite in weak or corrupted signal environments.

Satellite operators may also benefit from various embodiments of the present invention in which operators may precisely predict the navigation satellite trajectories for long durations (e.g., several weeks or months). Satellite operators may also benefit due to a reduction or elimination of system down-time due to orbit maneuvers (i.e., station keeping) since navigation satellites in accordance with various embodiments disclosed herein may be configured to perform continuous fine orbit control to minimize errors between predicted and nominal orbital paths. In one embodiment, software of conventional navigation satellites may be advantageously modified to accommodate commands to facilitate orbit control using appropriate propulsion actuators.

In embodiments where navigation satellites include onboard trajectory control, SIS ephemeris ranging errors may be reduced, for example by approximately a factor of ten, in comparison with embodiments where navigation satellites do not provide such control. In this regard, measurement errors by navigation satellites may be significantly less than corresponding measurement errors by tracking stations.

Embodiments described above illustrate but do not limit the invention. It should also be understood that numerous modifications and variations are possible in accordance with the principles of the present invention. Accordingly, the scope of the invention is defined only by the following claims.

We claim:

1. A method of adjusting a navigation satellite orbit, the method comprising:
   determining a nominal orbital path of the navigation satellite;
   transmitting ephemeris data corresponding to the nominal orbital path from the navigation satellite to a plurality of navigation devices;
   determining an actual orbital path of the navigation satellite locally at the navigation satellite, wherein the determining an actual orbital path comprises:
      measuring non-gravitational disturbance force effects locally at the navigation satellite to determine a relative position of the navigation satellite, wherein the measuring is performed by a drag free sensor of the navigation satellite, and
      using the relative position to determine the actual orbital path;
   maintaining the drag free sensor substantially at a center of gravity of the navigation satellite;
   determining a deviation between the actual orbital path and the nominal orbital path locally at the navigation satellite; and
   autonomously adjusting the actual orbital path locally at the navigation satellite to reduce the deviation between the actual orbital path and the nominal orbital path.

2. The method of claim 1, further comprising measuring an actual position of the navigation satellite using a local navigation device onboard the navigation satellite, wherein the determining an actual orbital path comprises using the measured actual position to determine the actual orbital path.

3. The method of claim 1, wherein the adjusting comprises commanding propulsion actuators of the navigation satellite to counteract the measured disturbance force effects.

4. The method of claim 1 wherein the maintaining comprises:
   measuring angular motion acceleration vectors associated with the drag free sensor; and
   adjusting a position of the drag free sensor until a sum of the angular motion acceleration vectors is approximately zero.

5. The method of claim 1, wherein the determining a nominal orbital path comprises:
   receiving the ephemeris data from a ground station; and
   determining the nominal orbital path locally at the navigation satellite using the ephemeris data.

6. The method of claim 1, wherein the determining a nominal orbital path comprises:
   receiving satellite state vector data, state vector covariance data, and force model data from a ground station; and
   determining the nominal orbital path locally at the navigation satellite using the satellite state vector data, state vector covariance data, and force model data.

7. The method of claim 1, wherein the ephemeris data is long duration ephemeris data.

8. A method of adjusting a navigation satellite orbit, the method comprising:
   determining a nominal orbital path of the navigation satellite;
   transmitting ephemeris data corresponding to the nominal orbital path from the navigation satellite to a plurality of navigation devices;
   determining an actual orbital path of the navigation satellite locally at the navigation satellite, wherein the determining an actual orbital path comprises:
      measuring non-gravitational disturbance force effects locally at the navigation satellite to determine a relative position of the navigation satellite, wherein the measuring is performed by a drag free sensor of the navigation satellite, wherein the drag free sensor comprises a proof mass enclosed by a vacuum caging system, and
      using the relative position to determine the actual orbital path;
   determining a deviation between the actual orbital path and the nominal orbital path locally at the navigation satellite; and
   autonomously adjusting the actual orbital path locally at the navigation satellite to reduce the deviation between the actual orbital path and the nominal orbital path.

9. A navigation satellite comprising:
   a receive antenna adapted to receive ephemeris data from a ground station, wherein the ephemeris data corresponds to a nominal orbital path of the navigation satellite;
   a memory adapted to store the ephemeris data;
   a transmit antenna adapted to transmit the ephemeris data to a plurality of navigation devices;

a plurality of propulsion actuators;
a drag free sensor adapted to measure non-gravitational disturbance force effects locally at the navigation satellite to determine a relative position of the navigation satellite;
an assembly adapted to maintain the drag free sensor substantially at a center of gravity of the navigation satellite; and
a processor adapted to:
 determine an actual orbital path of the navigation satellite using the relative position,
 determine a deviation between the actual orbital path and the nominal orbital path, and
 command the propulsion actuators to adjust the actual orbital path to reduce the deviation between the actual orbital path and the nominal orbital path.

10. The navigation satellite of claim 9, further comprising a local navigation device adapted to determine an actual position of the navigation satellite, wherein the processor is adapted to determine the actual orbital path using the actual position.

11. A navigation satellite comprising:
a receive antenna adapted to receive ephemeris data from a ground station wherein the ephemeris data corresponds to a nominal orbital path of the navigation satellite;
a memory adapted to store the ephemeris data;
a transmit antenna adapted to transmit the ephemeris data to a plurality of navigation devices;
a plurality of propulsion actuators;
a drag free sensor adapted to measure non-gravitational disturbance force effects locally at the navigation satellite to determine a relative position of the navigation satellite, wherein the drag free sensor comprises a proof mass enclosed by a vacuum caging system; and
a processor adapted to:
 determine an actual orbital path of the navigation satellite using the relative position,
 determine a deviation between the actual orbital path and the nominal orbital path, and
 command the propulsion actuators to adjust the actual orbital path to reduce the deviation between the actual orbital path and the nominal orbital path.

12. The navigation satellite of claim 9, wherein the assembly comprises:
a plurality of inertial angular motion sensors adapted to measure angular motion acceleration vectors associated with the drag free sensor;
a plurality of rollers;
a plurality of extendable members connected with the rollers and the drag free sensor; and
a plurality of sensor actuators connected with the extendable members and adapted to adjust a position of the drag free sensor until a sum of the angular motion acceleration vectors is approximately zero.

* * * * *